(No Model.)

N. S. GILBERT.
Machine for Packing Evaporated Fruit in Boxes.

No. 241,348. Patented May 10, 1881.

Witnesses:
N. C. McArthur
John C. Rogers

Inventor:
N. S. Gilbert,
per
W. H. Alexander,
Attorney.

N. PETERS, Photo-Lithographer, Washington, D. C.

UNITED STATES PATENT OFFICE.

NATHAN S. GILBERT, OF LOCKPORT, NEW YORK.

MACHINE FOR PACKING EVAPORATED FRUIT IN BOXES.

SPECIFICATION forming part of Letters Patent No. 241,348, dated May 10, 1881.

Application filed March 9, 1881. (No model.)

*To all whom it may concern:*

Be it known that I, N. S. GILBERT, of Lockport, in the county of Niagara and State of New York, have invented certain new and useful Improvements in a Machine for Packing Evaporated Fruits in Boxes; and I do hereby declare that the following is a full, clear, and exact description thereof, reference being had to the accompanying drawings, and to the letters of reference marked thereon, which form part of this specification, and in which—

Figure 1:
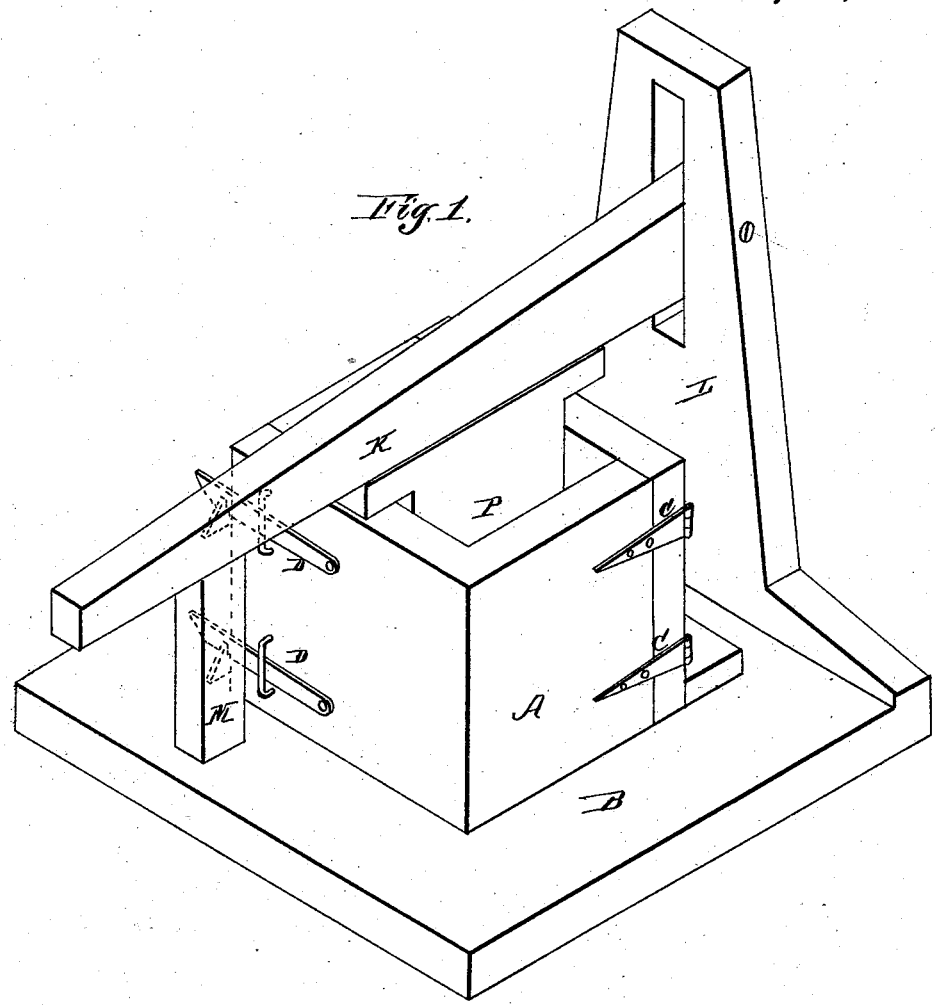
Figure 2:
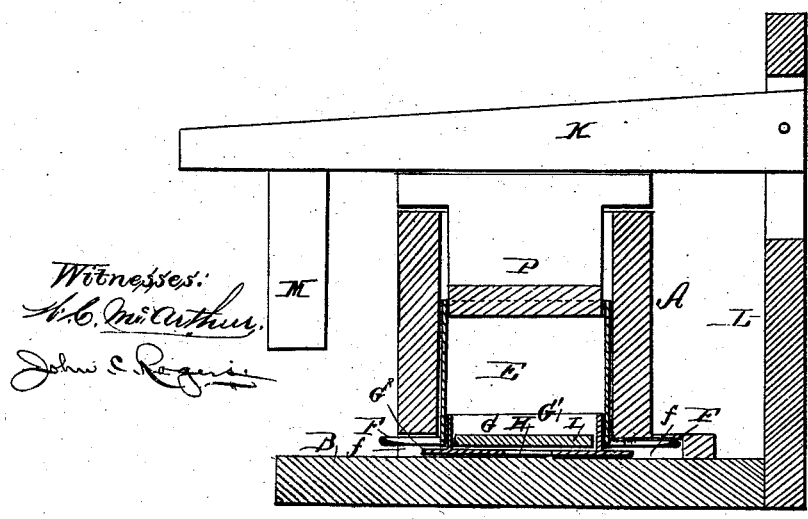

Figure 1 is a perspective view of the fruit-packer; and Fig. 2, a central longitudinal section of the same.

The object of this invention is to provide an apparatus for facilitating the packing of dried fruits in boxes.

The device consists, principally, of a box provided with a detachable perforated bottom, and a false bottom or relief-plate resting upon the said perforated bottom, this box being arranged within a two-part casing, and a follower and presser bar or lever employed for compressing the fruit into a compact form within the box. The construction of these parts admits of the box containing the compressed fruit being readily removed from the two-part casing and the box in which the fruit is to be packed fitted upon the aforesaid box, after which the whole can be placed in an inverted position under the lever and the latter brought down so that an arm thereon will pass through the perforation in the detachable bottom and rest upon the relief-plate or false bottom, so that when the box in which the fruit has been compressed, and also the detachable bottom of said box, are elevated, the fruit will be left in a compact form in the box destined to finally receive the fruit.

In the drawings, A indicates the two-part casing, which is supported upon a suitable base, B. The two parts of this casing are hinged together by means of hinges, C C, and when closed are locked by the latches D D.

The letter E refers to the box in which the fruit is compressed. This box is provided with handles, F F, whereby it can be readily handled, the walls of the two-part casing having recesses, $f f$, formed in them to receive said handles when the box is arranged within the casing.

G indicates the detachable bottom of the box E. This detachable bottom has a vertical flange, G', which fits within the lower portion of the box, and a horizontal flange, $G^2$, upon which the lower edge of the said box rests. It is also formed with a central perforation, H, the use of which will be presently described.

I indicates the false bottom or relief-plate, that is adapted to fit within the box and rest upon the detachable bottom thereof.

The presser bar or lever K is pivoted in a standard, L, that is mounted upon the base B, the said lever being arranged to extend across the two-part casing so that it can be brought down upon the same. The lever or presser-bar is provided with a downwardly-projecting arm, M, adapted to enter the perforation of the detachable bottom of the box.

P indicates the follower, that is adapted to work in the box E for the purpose of compressing the fruits therein.

The operation is as follows: The box E, with the detachable bottom fitted thereto, and the false bottom or relief-plate resting upon the detachable bottom, is placed upon the base B within the two-part casing, which is locked by means of the latches. The box being filled with sliced or other dried fruit, the plunger is placed upon the top of the mass and the presser-bar brought down so as to depress the plunger and pack the fruit. The two-part casing is then opened, the plunger removed, and a packing-box inverted and fitted upon the box E. The boxes thus fitted together are then placed in an inverted position upon the base, so as to bring the packing-box right side up, after which the lever or presser-bar is brought down so that its arm M will pass through the perforation of the detachable bottom and bear upon the false bottom or relief-plate. By now raising the box E by its handles, and pressing upon the presser-bar, if the weight thereof is not sufficient, the said box will be drawn out from the packing-box, and the packed mass of fruit, which will be prevented from being raised along with the box by reason of the false bottom or relief-plate that is held down by the presser-bar arm, will be left in a compact state within the packing-box.

What I claim as my invention, and desire to secure by Letters Patent, is—

1. The combination, in a fruit-packer, of a pivoted presser-bar, with the plunger, the box in which the plunger works and the fruit is compressed, and the detachable bottom fitted to said box, substantially as described.

2. The combination, in a fruit-packer, of the presser-bar with the box in which the fruit is compressed, a detachable bottom for said box formed with a perforation adapted to admit of the passage of an arm of the presser-bar, and the independent false bottom or relief-plate adapted to fit in the box and rest upon its perforated bottom, substantially as described.

3. The combination, in a fruit-packer, of the two-part casing with the box in which the fruit is compressed, the perforated detachable bottom for said box, the independent false bottom or relief-plate, the follower, and the pivoted presser-bar provided with an arm adapted to pass through the perforation of the detachable bottom, substantially as described.

4. The combination, in a fruit-packer, of the box in which the fruit is compressed, with the detachable bottom provided with a continuous vertical and a continuous horizontal flange, and with a central perforation, the plunger, the two-part casing mounted upon a suitable base, and the presser-bar, adapted to act upon the plunger and provided with an arm adapted to pass through the perforation of the detachable bottom and act upon the relief-plate when the box is inverted, substantially as and for the purpose described.

In testimony that I claim the foregoing as my own I affix my signature in presence of two witnesses.

N. S. GILBERT.

Witnesses:
J. A. DRIESS,
DAVID MILLAR.